United States Patent
Hirst et al.

[11] 3,814,200
[45] June 4, 1974

[54] LOCK FOR AN OSCILLATABLE AXLE

[75] Inventors: Richard William Hirst, Hazel Green, Wis.; Conrad Stone Brooks, Dubuque, Iowa

[73] Assignee: Deere & Company, Moline, Ill.

[22] Filed: Mar. 19, 1973

[21] Appl. No.: 342,675

[52] U.S. Cl............ 180/41, 180/82 A, 180/103, 280/6 R, 280/111, 280/150 A, 280/150 C
[51] Int. Cl............................................ B60g 19/10
[58] Field of Search... 180/41, 103; 280/6 R, 150 C, 280/150 A, 111, 297; 214/765

[56] References Cited
UNITED STATES PATENTS

| | | | |
|---|---|---|---|
| 237,927 | 2/1881 | Taynton et al. | 280/6 R |
| 905,985 | 12/1908 | Clove | 180/41 X |
| 923,964 | 6/1909 | Floyd | 180/41 |
| 970,783 | 9/1910 | Boenker | 180/41 |
| 3,171,556 | 3/1965 | Brekelbaum et al. | 214/765 |
| 3,349,932 | 10/1967 | Wagner | 280/111 X |

FOREIGN PATENTS OR APPLICATIONS

| | | | |
|---|---|---|---|
| 293,900 | 3/1932 | Italy | 180/41 |

*Primary Examiner*—David Schonberg
*Assistant Examiner*—John P. Silverstrim

[57] ABSTRACT

A vehicle has an oscillatable axle to which is fixed a toothed bar curved arcuately about the axis of oscillation of the axle. A hydraulically operable latch member is mounted on the frame of the vehicle and is selectively removable into and out of engagement with and from the teeth of the toothed member.

10 Claims, 8 Drawing Figures

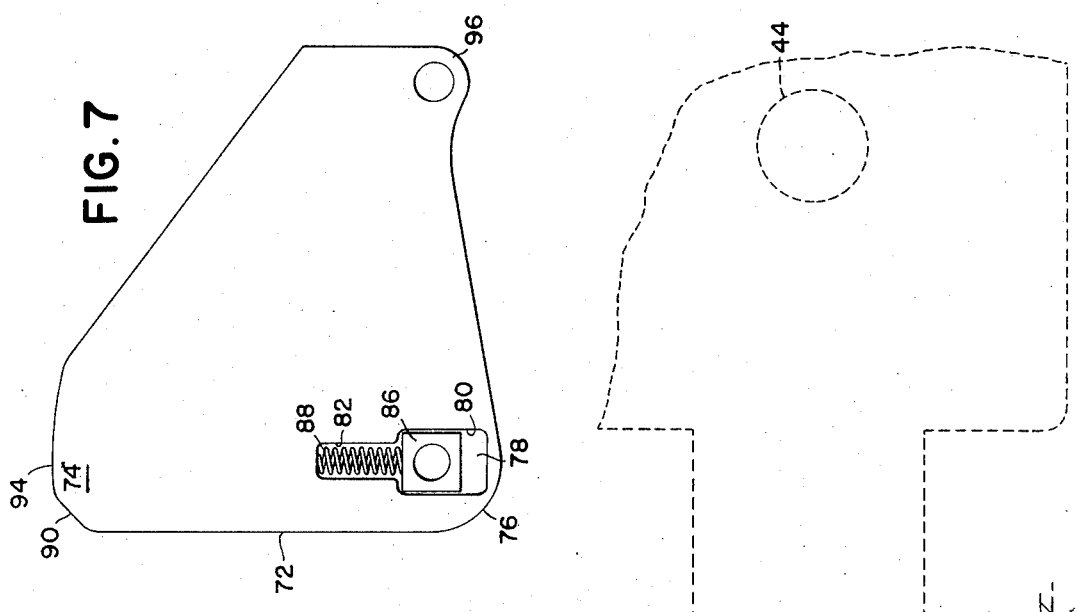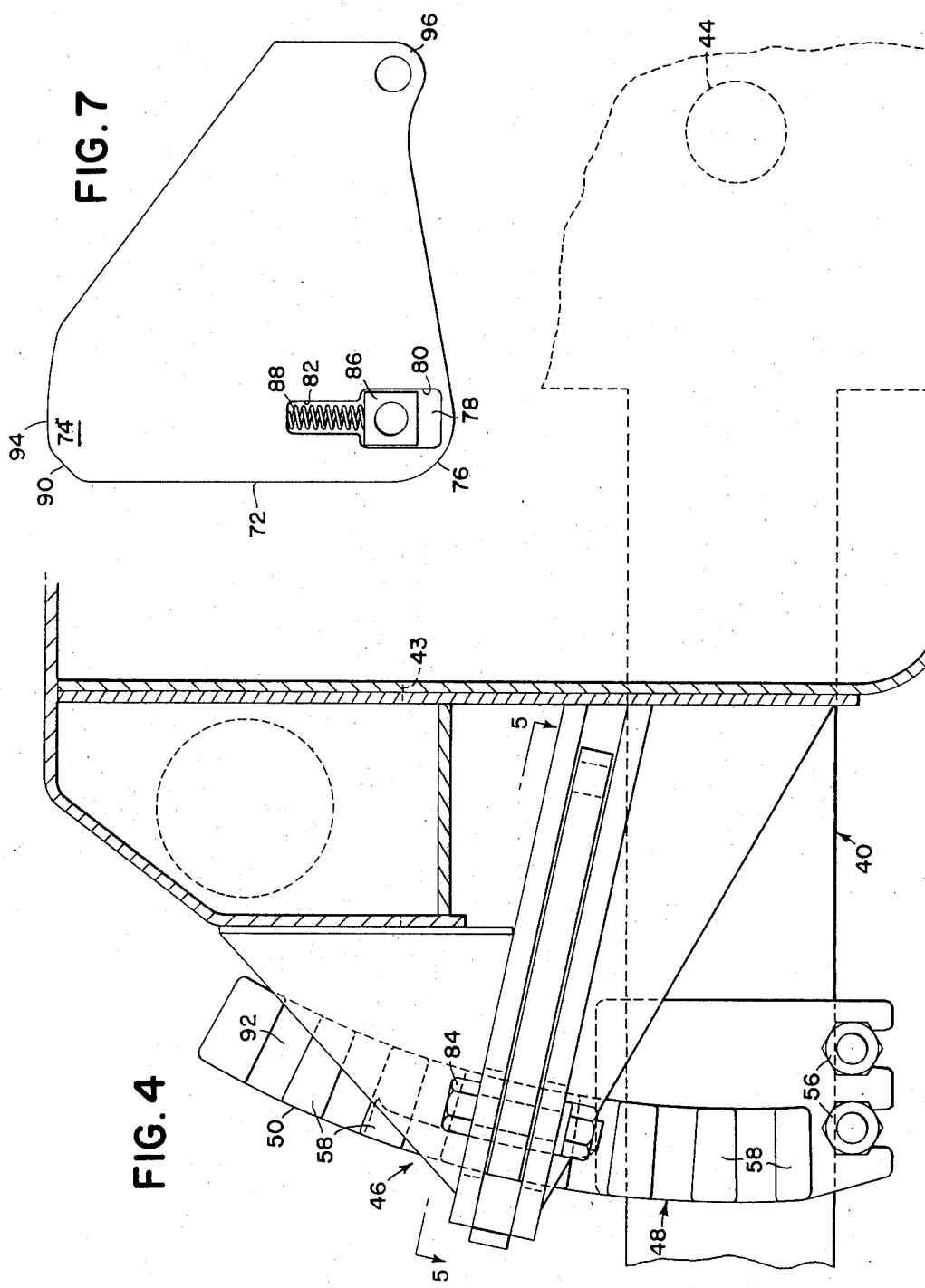

LOCK FOR AN OSCILLATABLE AXLE

BACKGROUND OF THE INVENTION

The present invention relates to a vehicle having an oscillatable axle and more specifically relates to a lock mechanism for selectively fixing the oscillatable axle relative to the vehicle frame.

It is a common practice in the art to provide off-the-road vehicles with oscillating axles which carry ground or traction wheels for the purposes of ensuring a smoother ride for the operator, of ensuring that the traction wheels are always in driving contact with the ground and for ensuring that devices such as scraper blades and the like remain at a fixed level when the wheels are passing over obstacles such as logs or rocks or the like. It is also a known practice in the art to provide axle lock means for fixing the oscillating axle relative to the frame when it is desired to provide a stable base during certain operations of the devices carried by the vehicle frame.

These known axle locks suffer one or both of the disadvantages of lacking sufficient ruggedness to withstand the duty required and of lacking some means for minimizing problems attendant with the operation of the vehicle in trashy conditions.

Accordingly, it is a broad object of the invention to provide an axle lock which overcomes the disadvantages of the prior art axle locks, referred to above. More specifically, it is an object to provide an axle lock including a toothed bar fixed to the axle for oscillating movement therewith at a location at one side of the vehicle frame and to provide a latching plate selectively movable into and out of engagement with the teeth of the toothed bar.

Another object is to provide a latching plate as described above which is shaped and mounted so as to wipe or push out any foreign matter which might be collected on the teeth of the toothed member.

A further object of the invention is to provide a latch plate, as aforedescribed, which is moved between engaged and disengaged positions by means of an extensible and retractable hydraulic actuator which is actuated automatically in response to the vehicle transmission being shifted to neutral and engaged conditions.

These and other objects will become apparent from the following description and the appended drawings.

SUMMARY OF THE INVENTION

An off-the-road vehicle includes an axle mounted to the main frame of the vehicle for oscillating about a central fore-and-aft extending axis. The opposite ends of the axle respectively extend beyond the opposite sides of the vehicle main frame and a toothed bar is fixed to the axle at a location between one end thereof and the adjacent vehicle frame side. The toothed bar is curved arcuately about the axis of oscillation of the axle and a latch plate or member is pivotally mounted on the main frame for movement between the latched and unlatched positions respectively when it is engaged with the disengaged from the teeth of the toothed member. An extensible and retractable hydraulic actuator is connected between the latch plate and the vehicle main frame and automatically controlled to effect the engagement of the latch plate with the teeth when the vehicle transmission is shifted to a neutral condition and to move the latch plate to its disengaged position when the vehicle transmission is in an engaged condition.

BRIEF DESCRIPTION OF THE DRAWINGS

FIG. 4 is a broken view partially in section showing the lock mechanism in rear elevation and showing its relationship to the fore-and-aft pivot axis of the axle.

FIG. 7 is a top plan view of the latch plate shown in FIGS. 5 and 6.

DESCRIPTION OF THE PREFERRED EMBODIMENT

Figure 1:
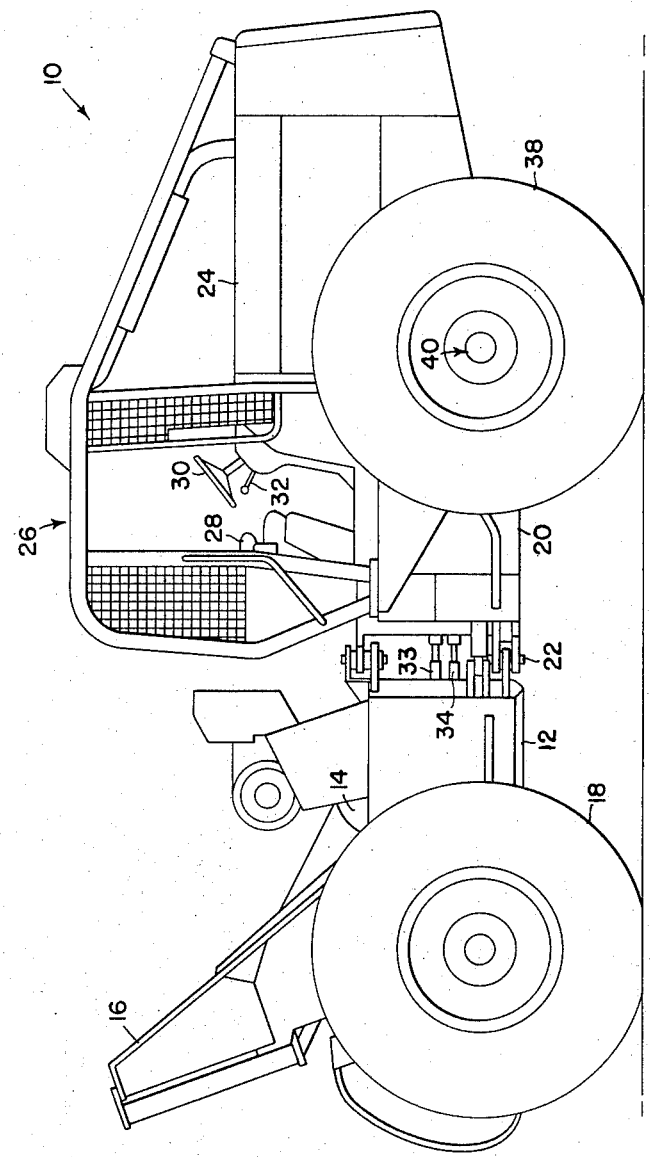
FIG. 1 is a side elevational view of a typical off-the-road vehicle in which the present invention is particularly suited to be embodied.

Referring now to FIG. 1, therein is shown an off-the-road vehicle indicated in its entirety by the reference numeral 10. While any one of several types of off-the-road vehicles could have been chosen, the one depicted here is an articulated skidder tractor including a rear frame structure 12 on which a conventional winch 14 and a conventional fairlead 16 are mounted. The rear frame structure 12 is supported on a pair of driven rear wheels, one of which is shown at 18, and is pivotally connected to a front frame structure 20 through means of a pivot structure 22 which defines a vertical pivot axis. The front frame structure 20 supports a conventional internal-combustion engine, mounted within an engine enclosure 24 and supports an operator's station 26 including a forwardly facing seat 28 and a plurality of controls for the vehicle including a steering wheel 30 and a transmission shift lever 32, the shift lever being provided for effecting different conditions of operation in a transmission supported at the lower rear portion of the front frame structure 20 and having rear drive wheel and winch drive shafts 33 and 34, respectively, extending rearwardly therefrom. The front frame structure 20 is supported on a pair of front drive wheels, one of which is shown at 38, through an oscillating axle structure, indicated generally by the numeral 40. While the details of the axle structure 40 and its connection to the front frame structure 20 are not shown, the axle structure 40 and its connection to the front frame structure 20 are preferably similar to the axle structure and connection disclosed in U.S. Pat. No. 3,481,421 issued to P. M. Sullivan on 2 Dec. 1969.

Figure 2:
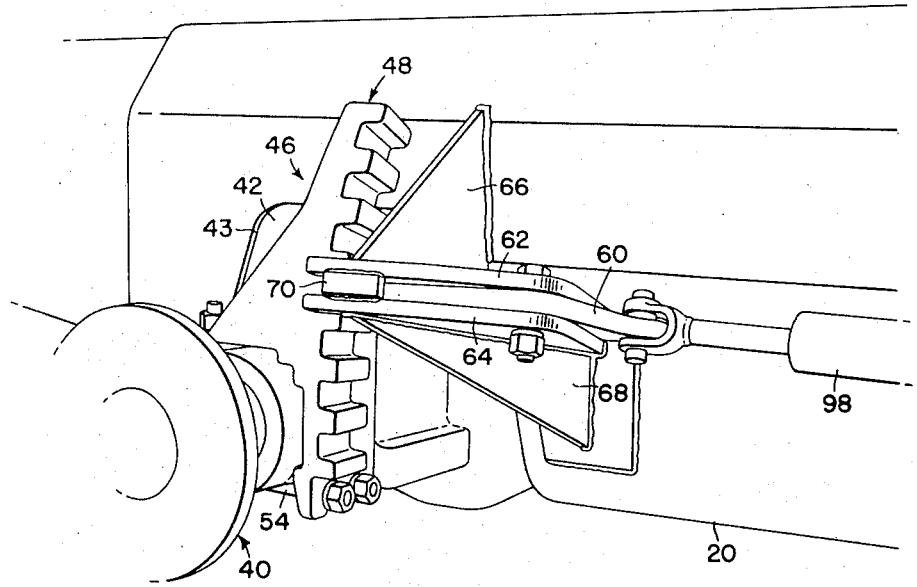
FIG. 2 is a side perspective view of the axle lock as it would appear when mounted on the vehicle shown in FIG. 1.

As can best be seen in FIGS. 2 and 4, the oscillating axle structure 40 is disposed in a laterally extending opening 42 which extends the width of the front frame structure, the intersection of the opening 42 with the opposite sides of the front frame structure forming a generally inverted U-shaped edge 43. The upper or horizontal portion of the opening is sufficiently elevated to permit limited oscillation of the axle structure 40 about a fore-and-aft extending horizontal pivot axis defined by a pivot pin 44 located centrally between the opposite sides of the vehicle 10. Thus the axle structure 40 moves vertically to permit both front drive wheels 38 to remain upon the ground even in relatively rough terrain.

For the purpose of locking the axle structure 40 to the front frame structure 20 so as to form a rigid base, for example, when the winch 14 is being operated to haul in a load of logs, there is provided an axle lock indicated in its entirety by the reference numeral 46. The axle lock 46 includes a toothed member 48 here shown fixed to the axle structure 40 between the left end of the axle structure and the left side of the front frame structure 20. The toothed member 48 includes an upright portion 50 which embraces the rearward side of the axle structure 40 and extends arcuately upwardly about the axis of the pivot pin 44 from a location just below the axle structure to a location spaced considerably above the axle structure. Formed integrally with the upright portion 50 is a forwardly extending gusset-like portion 52 having a lower surface which embraces the top of and extends just forwardly of the axle structure 40. The toothed member 48 is secured to the axle structure 40 through means of a pair of angled bolts 54 which have first ends received in respective openings in the gusset-like portion 52 of the toothed member and which has second ends respectively received in a pair of notches formed in the bottom end of the upright portion 50 of the toothed member. Four nuts 56 are respectively threaded onto the ends of the bolts 54 for tightly clamping the toothed member 48 on the axle structure 40. The upright portion 50 of the toothed member 48 includes a plurality of equally spaced rearwardly facing teeth 58, the spaces between adjacent ones of the teeth 58 having open ends which are respectively in alignment with a plurality of imaginary, angularly spaced, coplanar radial lines extending from a point on the axis defined by the pivot pin 44.

A latch member or plate 60 is mounted on the front frame structure 20 for movement between an unlatched position wherein it is spaced away from the toothed member 48 and a latched position wherein it is disposed between adjacent ones of the teeth 58 of the toothed member 48. Specifically, the latch member or plate 60 is located between upper and lower substantially identical guide plates 62 and 64, respectively, which are secured to the front frame structure 20 through means including upper and lower gusset plates 66 and 68, respectively. A spacer 70 is fixed between the outer edge portions of the guide plates 62 and 64 to ensure that the latter are spaced sufficiently to permit the free movement of the latch member therebetween.

Figure 5:
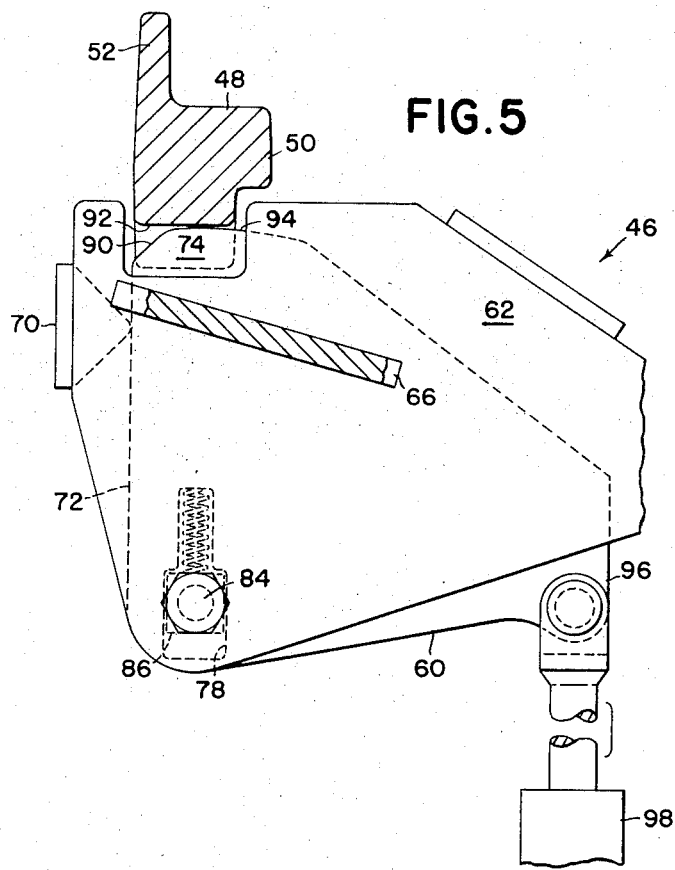
FIG. 5 is a broken sectional view taken along the line 5—5 of FIG. 4 with the latch plate being shown in a locked position in full engagement with the toothed member.
Figure 6:
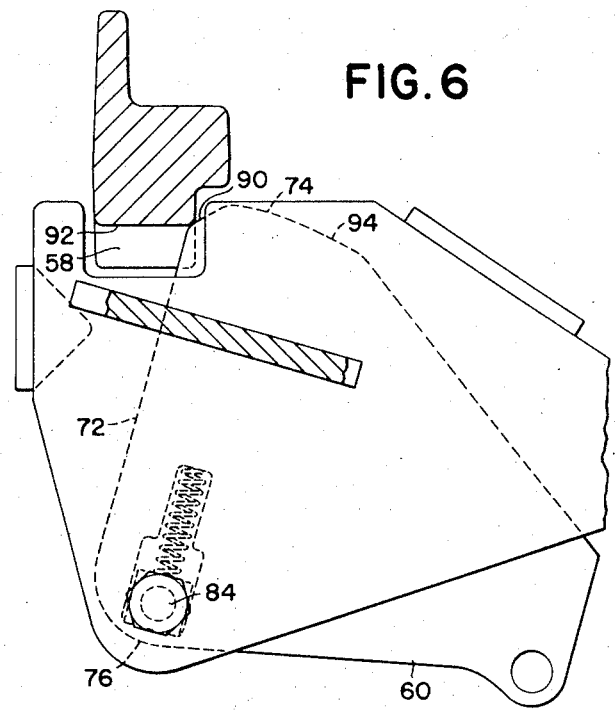
FIG. 6 is a view similar to FIG. 5 but showing the latch plate in a position wherein it is just contacting the toothed member.
Figure 3:
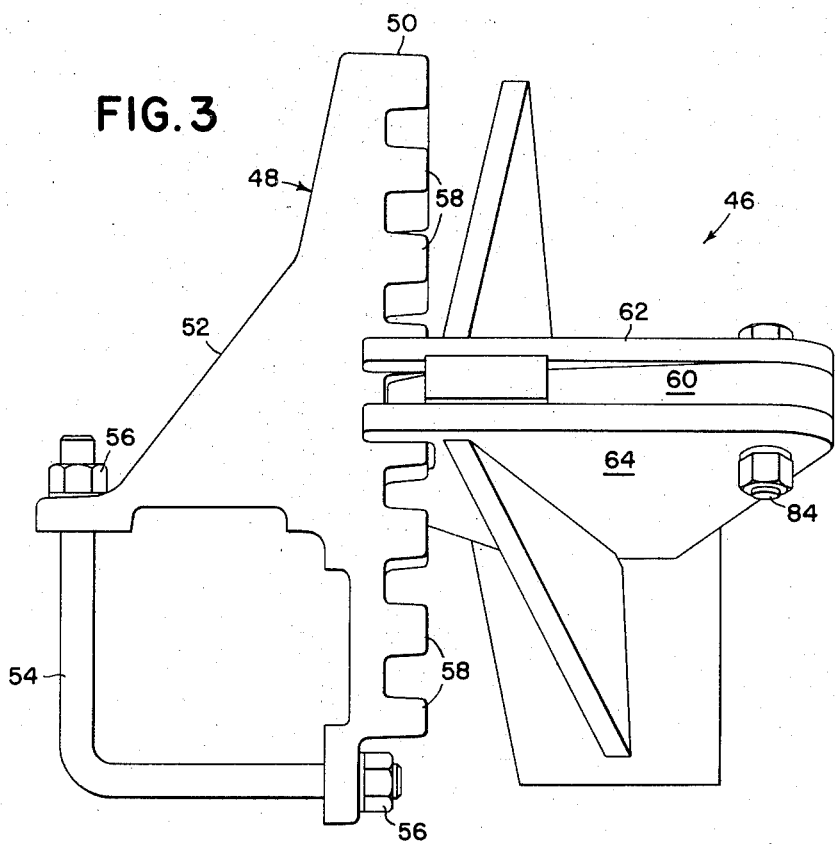
FIG. 3 is an enlarged side view of the axle lock shown in FIG. 2 but with the hydraulic actuator being removed.

The latch member or plate 60 is generally triangular and when the latch member is in a fully engaged position, as shown in FIG. 5, a first side 72 will be disposed so as to extend generally parallel to the side of the front frame structure 20 between a forward corner portion 74, which is located between adjacent ones of the teeth 58 of the toothed member 48 and a rearward corner portion 76. Located in the latch member 60 adjacent the rearward corner portion 76 is a fore-and-aft elongated opening 78 including a rearward rectangular portion 80 and a forward rectangular portion 82 reduced in width relative to the portion 80. Extending through aligned apertures in the upper and lower guide plates 62 and 64 and being received in the opening 78 in the latch member 60 is a pivot pin 84. A guide or spacer block 86 is pivotally received on the pivot pin 84 and is slidably received in the rearward rectangular portion 80 of the opening 78 of the latch member 60. The latch member 60 is biased forwardly through means of a spring 88 having its opposite ends seated against the forward end of the forward rectangular portion 82 of the opening 78 and the guide block 86. The forward corner portion 74 of the latch member 60 is specially shaped to cooperate with the lost-motion connection afforded by the opening 78, the guide block 86 and the spring 88 so as to wipe trash and other foreign matter from between the teeth 58 of the tooth member 48 when the latch member 60 moves from a partially engaged intermediate position, as shown in FIG. 6, to the fully engaged position shown in FIG. 5. Specifically, the forward corner portion 74 includes a leading edge 90 which is inclined forwardly and inwardly from the side 72 of the latch member and which is disposed so as to engage the respective inner ends of the respective surfaces 92 joining the bases of respective adjacent teeth 58 when the latch member 60 is in the intermediate position shown in FIG. 6. An arcuate edge 94 extends inwardly from the inward end of the inclined leading edge 90 and is located upon a radius drawn from the pivot pin 84 when the latch member 60 is at its forwardmost position relative to the pivot pin 84, as shown in FIG. 6. Extending between an inner rearward corner 96 of the latch member 60 and the side of the front frame structure 20 is a hydraulic actuator 98 that is extensible and retractable respectively for engaging and disengaging the latch member 60 with and from the tooth member 48.

Figure 8:
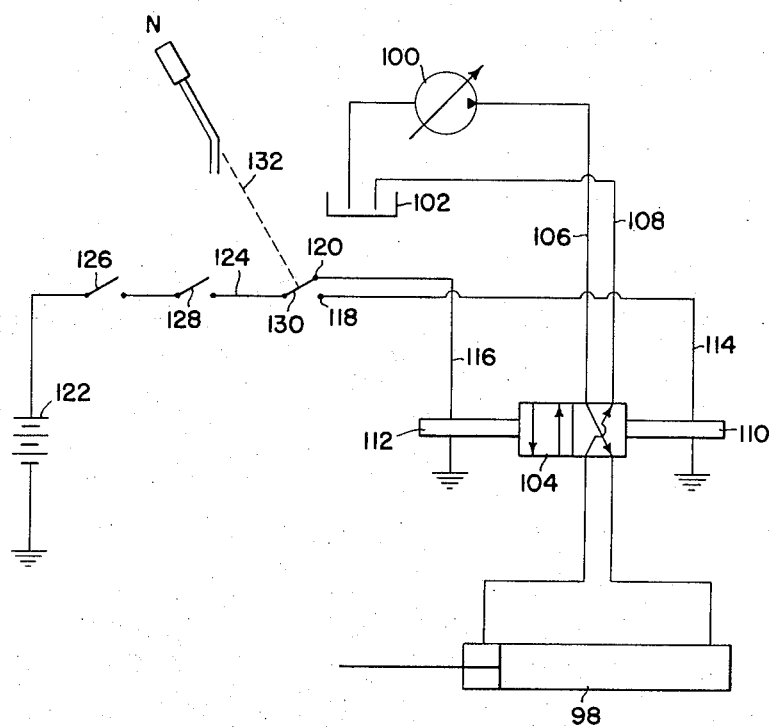
FIG. 8 is a schematic of the control system for the hydraulic actuator of the axle lock.

As can be seen in FIG. 8, the hydraulic actuator 98 is connected in a hydraulic system including a variable displacement pump 100 and a reservoir 102 respectively connected to a two-position, four-way direction control valve 104 through means of feed and return lines 106 and 108. The control valve 104 is in turn connected to opposite work ports respectively at the rod and cylinder ends of the actuator 98 through means of control lines 110 and 112. The control valve 104 is here shown in a first or latch-engaging position wherein the pump 100 is connected to the piston end of the actuator and wherein the reservoir 102 is connected to the rod end of the actuator, the actuator 98 thus being conditioned for extending and moving the latch member 60 counterclockwise about the pivot pin 84 towards the engaged position shown in FIG. 5. The control valve 104 is selectively shiftable rightwardly from the position illustrated in FIG. 8 to a second or latch-disengaging position wherein the pump is connected to the rod end of the actuator and the reservoir is connected to the piston end of the actuator, the actuator 98 thus being conditioned to retract and move the latch member 60 clockwise about the pivot pin 84 towards a fully disengaged position (not shown). For the purpose of selectively moving the control valve 104 between its first and second positions, the right- and left-hand solenoids 110 and 112 are respectively connected to the right- and left-hand ends of the valve 104. Respectively connected to the solenoids 110 and 112 are right- and left-hand control leads 114 and 116 which respectively terminate in contacts 118 and 120.

A source of electrical current for operating the solenoids is provided by a battery 122 having one end of a power line 124 connected thereto. Connected in series in the power line 124 are an ignition switch 126, a manually operable on-off switch 128 and a shift lever position-responsive switch 130. The transmission shift lever 32 is connected to the switch 130 through means represented here by the dashed line 132 for causing the switch 130 to be automatically moved to a first position connecting the power line to the left-hand solenoid 112 through means of the control lead 116 when the shift lever is moved to a neutral position, as shown in FIG. 8, and for causing the switch 130 to be moved to a second position wherein the power line is connected to the right-hand solenoid 110 through means of the control lead 114 when the shift lever is moved from the neutral position.

The operation of the axle lock is as follows. Assuming that the vehicle 10 is in operation at a logging site, the ignition switch 126 will of course be closed and the operator will normally have closed the manually operable switch 128 since automatic operation of the axle lock 46 is normally desired at a logging site. Should the operator desire to hook onto and haul in a load of logs through means of the winch 14, he will normally stop the vehicle and manipulate the shift lever 32 to position it in the neutral position shown in FIG. 8. This results in the switch 130 being moved to its first position shown in FIG. 8 wherein it connects the power line 124 to the left-hand solenoid 112 to effect a shifting of the valve 104 leftwardly to its latch-engaging position shown in FIG. 8. Thus, the actuator 98 is controlled to extend and rotate the latch member 60 counterclockwise about the pivot pin 84. As the latch member 60 rotates, the leading edge 90 of the forward corner portion 74 will first come into contact with the toothed member 48. If one of the spaces between adjacent teeth 58 is aligned with the latch member 60, the leading edge 90 will contact the member 48 as shown in FIG. 6. As the hydraulic actuator 98 extends further, the edge 90 will act to move the latch member 60 rearwardly relative to the pivot pin 84 against the bias of the spring 88. This rearward movement of the latch member 60 continues until the leading edge 90 of the corner portion 74 clears the inside of the upright portion 50 of the member 48, the arcuate edge 94 of the corner portion 74 then coming into contact with the surface 92 connecting the bases of the adjacent teeth 58. The forward surface of the guide block 86 will now be adjacent the forward end of the rearward rectangular portion 80 of the opening 78. As the actuator 98 is extended further to move the latch member 60 to its fully engaged position shown in FIG. 5, the arcuate edge 94 will remain in contact with the surface 92 thus ensuring that the tooth space will be swept clear of any foreign matter located therein in the path of movement of the latch member 60. If one of the teeth 58 is aligned with the latch member 60 as the latter is being swung towards its engaged position, the latch member 60 will merely be urged against the aligned tooth until such time that the front frame structure 20 moves sufficiently to align the latch member with one of the spaces.

Once the load of logs is hauled in far enough to dispose them adjacent the fairlead 16 of the vehicle 10, the operator will normally then desire to skid the load of logs to a landing area. To begin the skidding operation, the operator will shift the lever 32 to a desired position for effecting a desired drive condition in the vehicle transmission. Upon moving the lever 32 from its neutral position, the switch 130 will be moved to its second position wherein it connects the power line 124 to the lead 114 and thus to the right-hand solenoid 110. The energized solenoid 110 causes the control valve 104 to be shifted rightwardly so as to connect the pump to the rod end of the actuator 98 while connecting the piston end of the actuator to the reservoir 102. The actuator 98 is thus actuated to retract to cause the latch member 60 to be rotated clockwise from its position shown in FIG. 5 to disengage it from the toothed member 48. The oscillating axle structure 40 is then free to oscillate within the limits permitted by the opening 42.

When travelling on the road, as when moving between or to and from logging sites, it normally will not be necessary to provide a stable base since none of the devices carried by the vehicle will likely be operated. Thus, the operator will normally place the manual switch 128 in its open position shown in FIG. 8 so that automatic actuation of the axle lock is prevented. However, it should be noted that before moving the switch 128 to its open position, the operator will normally operate the latch member or plate 60 so as to disengage it from the toothed member 48 to permit free oscillation of the axle structure 40.

We claim:

1. In a vehicle having a main frame to which the middle of an axle assembly is pivotally connected for permitting the axle assembly to swing about a horizontal, fore-and-aft extending axis and said axle assembly having opposite ends respectively spaced outwardly from opposite sides of said frame and having ground wheels rotatably mounted thereon, the combination therewith of a lock mechanism, for fixing said axle assembly in selected ones of a plurality of positions spaced angularly about said axis, comprising: a first member connected to and extending upwardly from said axle assembly at a location between one of said ground wheels and one side of said frame; a plurality of open ended openings being arranged in said first member such that the open ends thereof are respectively in alignment with a plurality of imaginary angularly spaced coplanar radial lines extending from a point on said axis and said openings being equispaced from said point; and power actuated latch means being connected to said main frame, so as to be located adjacent said first member, and including a latch member mounted for movement between latched and unlatched positions along an imaginary line extending radially from said point and being located in said common plane, whereby said axle will be locked relative to said frame when one of the openings located in said first member is aligned with said last-mentioned imaginary line and said latch member is moved from said unlatched position to said latched position.

2. The vehicle defined in claim 1 wherein said openings are in the form of grooves and said latch member comprises a plate mounted for pivotal movement about a second axis extending perpendicular to and for movement in a plane passing lengthwise through respective ones of said grooves when the latter are aligned with said last-mentioned imaginary line; and said plate having an end portion movable into and out of said respective aligned grooves.

3. The vehicle defined in claim 2 wherein said grooves respectively include bottom surfaces facing in a first direction; said plate being pivotally mounted through means including a pivot pin, spaced away from said first member in the direction faced by said bottom surfaces, and located along said second axis, connection means securing said plate to said pin for rotation thereabout and including lost-motion means permitting said plate to shift relative to said pin towards and away from said first member; biasing means acting on said plate and urging the latter towards a position for disposing said end portion at a maximum distance from said pivot pin; said end portion having an inclined leading surface disposed for respectively contacting the bottom surfaces of said grooves at one of the open ends of the grooves when the grooves are respectively located in the path of movement of the leading surface as the latch plate is moved from its unlatched position towards said latched position and said inclined leading surface acting in cooperation with said first member to cause said latch plate to be moved against the action of said biasing means to cause said end portion to move to a minimum distance from said pivot pin as the latch plate is actuated toward said latched position.

4. The vehicle defined in claim 1 wherein said connection means comprises a spacer block being pivotally mounted on said pin and having opposite parallel flat sides; an elongate opening located in said plate member; said block being received in said opening and said opening having opposite flat sides slidably engaging the opposite flat sides of said spacer block; and said biasing means comprising a compression coil spring having opposite ends in engagement with said spacer block and said plate.

5. The vehicle defined in claim 4 wherein said latching means further includes a pair of guide plates fixedly spaced from each other in loosely sandwiching relationship to said latch plate.

6. In a vehicle having a main frame supported upon ground-engaging means received on the opposite ends of an axle which is pivotally connected to the main frame for oscillating movement relative thereto about a substantially horizontal, fore-and-aft extending axis, the improvement being in a locking device for selectively preventing the oscillation of said axle, comprising: an elongate member being fixed to said axle adjacent one end thereof and extending upwardly therefrom; a plurality of receptacles being formed along the length of one surface of said member at locations equidistant from said axis; said receptacles having access openings respectively oriented so as to lie on imaginary lines radiating from said axis; lock means mounted on said main frame and including a latching element shiftably mounted for movement in an imaginary plane containing one of said imaginary lines radiating from said axis into and out of engagement with said receptacles.

7. The vehicle defined in claim 6 wherein said receptacles respectively comprise grooves extending radially relative to said axis.

8. The vehicle defined in claim 7 wherein said latching element comprises a flat plate lying in a plane radiating from said axis and being pivotally mounted for rotation about an axis extending perpendicular to said plane and spaced from said member generally in the direction faced by said one surface of said member.

9. The vehicle defined in claim 8 wherein said plate is mounted for rotation about said last-mentioned axis through connection means including lost-motion means permitting said plate to shift relative to said axis generally in a direction toward and away from said member; said plate including a leading edge positioned so as to enter any of said grooves located in said plane when said plate is pivoted from an unlatched position towards a latched position; biasing means urging said plate in a direction so as to dispose said leading edge at a maximum distance from the pivot axis of said plate; and said leading edge initially making contact with said member at one end of said groove as the plate is moved to said latched position and said leading edge being inclined so as to cause said plate to be urged against said biasing means to move the leading edge in a direction so as to dispose said leading edge at a minimum distance from the pivot axis of said plate as the plate is moved toward said latched position; and said lock means further including power means mounted between said main frame and plate for selectively moving the latter between said unlatched and latched positions.

10. The vehicle defined in claim 6 wherein said lock means includes an extensible and retractable power means connected between said main frame and latching element; said vehicle including a transmission shift lever movable among a neutral position, for effecting a neutral condition in a transmission of the vehicle, and active positions for effective drive conditions in the transmission; and lever position-responsive control means being connected between said lever and said power means for automatically controlling said power means to cause the latter to effect the engagement of said latching element with a respective receptacle when the shift lever is moved to said neutral position and for automatically controlling said power means to cause the latter to effect the disengagement of said latching element from a respective receptacle when the shift lever is moved from said neutral position to an active position.

* * * * *